(12) United States Patent
Shapiro (10) Patent No.: US 10,616,171 B2
(45) Date of Patent: *Apr. 7, 2020

(54) COMPACT VISUALIZATION INTO AGGREGATED EVENTS IN SOCIAL COLLABORATION PROGRAMS

(71) Applicant: International Business Machines Corporation, Armonk, NY (US)

(72) Inventor: Eitan Shapiro, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/270,618

(22) Filed: Feb. 8, 2019

(65) Prior Publication Data

US 2019/0173830 A1 Jun. 6, 2019

Related U.S. Application Data

(63) Continuation of application No. 15/002,487, filed on Jan. 21, 2016, now Pat. No. 10,305,846.

(51) Int. Cl.
*G06F 15/16* (2006.01)
*H04L 12/58* (2006.01)
*H04W 4/21* (2018.01)

(52) U.S. Cl.
CPC .............. *H04L 51/32* (2013.01); *H04L 51/36* (2013.01); *H04W 4/21* (2018.02)

(58) Field of Classification Search
CPC ....... H04L 51/32; H04L 51/36; H04L 67/204; H04W 4/21

USPC .......... 709/206, 204, 205, 201, 224
See application file for complete search history.

(56) References Cited

U.S. PATENT DOCUMENTS

| 6,883,019 | B1 | 4/2005 | Sengupta |
| 8,589,808 | B1 | 11/2013 | Alfaro |
| 8,666,436 | B2 * | 3/2014 | Ellanti .............. H04M 1/72572 455/404.2 |
| 8,788,942 | B2 * | 7/2014 | Jain ........................ G06Q 10/00 715/733 |

(Continued)

OTHER PUBLICATIONS

List of IBM Patents or Patent Applications Treated as Related. Filed Feb. 8, 2019, 2 pages.

(Continued)

*Primary Examiner* — Liang Che A Wang
*Assistant Examiner* — Kaylee J Huang
(74) *Attorney, Agent, or Firm* — Andrew Aubert (57) ABSTRACT

Embodiments of the present invention provide systems and methods for applying social collaboration programs. Within a social network setting, a user can be connected to other users within the social network setting. Counters are collected on events associated with the other users within the social network setting and a visual representation is outputted to the user. The visual representation includes keywords; a count bar (with sub-sections) indicative of a number of occurring events associated with the other users within the social network setting; a total number of events among the other users within the social network setting; and the image of the other users associated with the count bar. Events are analyzed by utilizing mapping logic, inverted structures, indexed structures, and aggregating collected counters.

18 Claims, 6 Drawing Sheets

(56) References Cited

U.S. PATENT DOCUMENTS

| | | |
|---|---|---|
| 8,898,713 B1 | 11/2014 | Price |
| 9,002,924 B2 | 4/2015 | Saretto |
| 2013/0046826 A1 | 2/2013 | Stanton |
| 2013/0268597 A1 | 10/2013 | Van Hoff |
| 2013/0297705 A1 | 11/2013 | Arora |
| 2013/0304822 A1* | 11/2013 | Tetreault ............ H04N 21/2187 709/204 |
| 2014/0337450 A1* | 11/2014 | Choudhary ....... G06F 16/24578 709/206 |
| 2015/0172147 A1 | 6/2015 | Chan |
| 2015/0213141 A1 | 7/2015 | Wable |
| 2015/0248480 A1 | 9/2015 | Miller |
| 2017/0214648 A1 | 7/2017 | Shapiro |

OTHER PUBLICATIONS

"PDSE: Method of categorizing and presenting aggregated posts from a plurality of social networking sites", An IP.com Prior Art Database Technical Disclosure, IP.com No. 000227973, May 30, 2013, pp. 1-3.

"User Interface to Visualize Activity in stream via an Icon/Symbol Tag cloud", An IP.com Prior Art Database Technical Disclosure, IP.com No. 000219067, Jun. 18, 2012, pp. 1-3.

\* cited by examiner

COMPACT VISUALIZATION INTO AGGREGATED EVENTS IN SOCIAL COLLABORATION PROGRAMS

BACKGROUND OF THE INVENTION

The present invention relates generally to the field of graphical visualization, and more specifically to applying compact visualization into aggregated events in social collaboration programs.

Social collaboration programs are tools employed by business enterprises as a way to transition into becoming more open, innovative, and agile entities. While companies are using social collaboration tools to assist in productivity, social collaboration can also be employed by individuals, can manage personal tasks, professional projects, and social networks. The amount of events which influence workers on a daily basis is typically huge and growing day-by-day. The application of social collaboration programs aims to facilitate the efficient flow of information and knowledge between people without hierarchical barriers in order to complete required tasks on a daily basis.

SUMMARY

According to one embodiment of the present invention, a method for applying social collaboration programs is provided, the method comprising the steps of: receiving, by one or more processors, user information wherein a level of relationship of a group of users to a first user is configured; collecting, by one or more processors, information on occurring events attributed to the group of users; analyzing, by one or more processors, the information on the occurring events attributed to the group of users; and outputting, by one or more processors, a visual representation to the first user of analyzed information on the occurring events associated with the group of users.

Another embodiment of the present invention provides a computer program product for applying social collaboration programs, based on the method described above.

Another embodiment of the present invention provides a computer system for applying social collaboration programs, based on the method described above.

According to an aspect of the present invention, there is a method, computer program product and/or system for use in a distributed computing environment that performs the following operations (not necessarily in the following order): (i) receiving an end user configuration information data set including: (i) information indicative of a relationship between a first user and a plurality of entities in a defined social environment, and (ii) information indicative of a degree of the relationship between the first user and each entity of the plurality of entities in the defined social environment; (ii) receiving an insight query data set including information indicative of: (a) a target date of events, (b) a target data bucket including a plurality of events from a social activity stream, and (c) a target degree of relationship between the end user and a queried entity; (iii) processing an insight query based, at least in part, on the insight query data set, with the processing including: (a) collecting an event count data set including information indicative of a sum total number of times events occurred, counting only events that: (1) occurred on the target date of events, (2) are located within the target data bucket, and (3) were undertaken by entities of the plurality of entities that match the target degree of relationship, (b) aggregating counters from multiple social network services into the collected event count data set, (c) managing social information associated with the plurality of entities, and (d) determining a query response data set based, at least in part, on the event count data set; and (iv) outputting a visual representation of the query response data set to at least one computer device over a computer network.

DETAILED DESCRIPTION

Many social networking systems display a feed of events, indicate a level of relevance to the user of the social networking system, and perform aggregation based on the content item (i.e., the process of collecting content from multiple social network services into one unified presentation). Enterprises (or business entities) which use a social collaboration program/platform have generated interest based on the return on investment (ROI) upon processing information via the social collaboration program. The ROI is the information and knowledge flow between people without any hierarchical barriers (e.g., disparate social network activities). Social collaboration programs allow a user to follow different entities. Thus, it can be difficult to capture in a short period of time what events are happening around the user and the relevance of these events (as the user might not be aware of these events). It can be beneficial for the user to know about these events at the desired time and to be able to at least immediately react to these events. Embodiments of the present inventions disclose methods and systems to address a large (and even growing) number of events occurring within an enterprise via an algorithm which directs the user to take into consideration multiple dimensions; focus on personalization analytics (to gain insights/knowledge into the user); and analyzes information from potentially disparate social network services (to output a visualization to a user). The visualization allows a user to quickly and easily figure what needs to be focused on.

Figure 1:
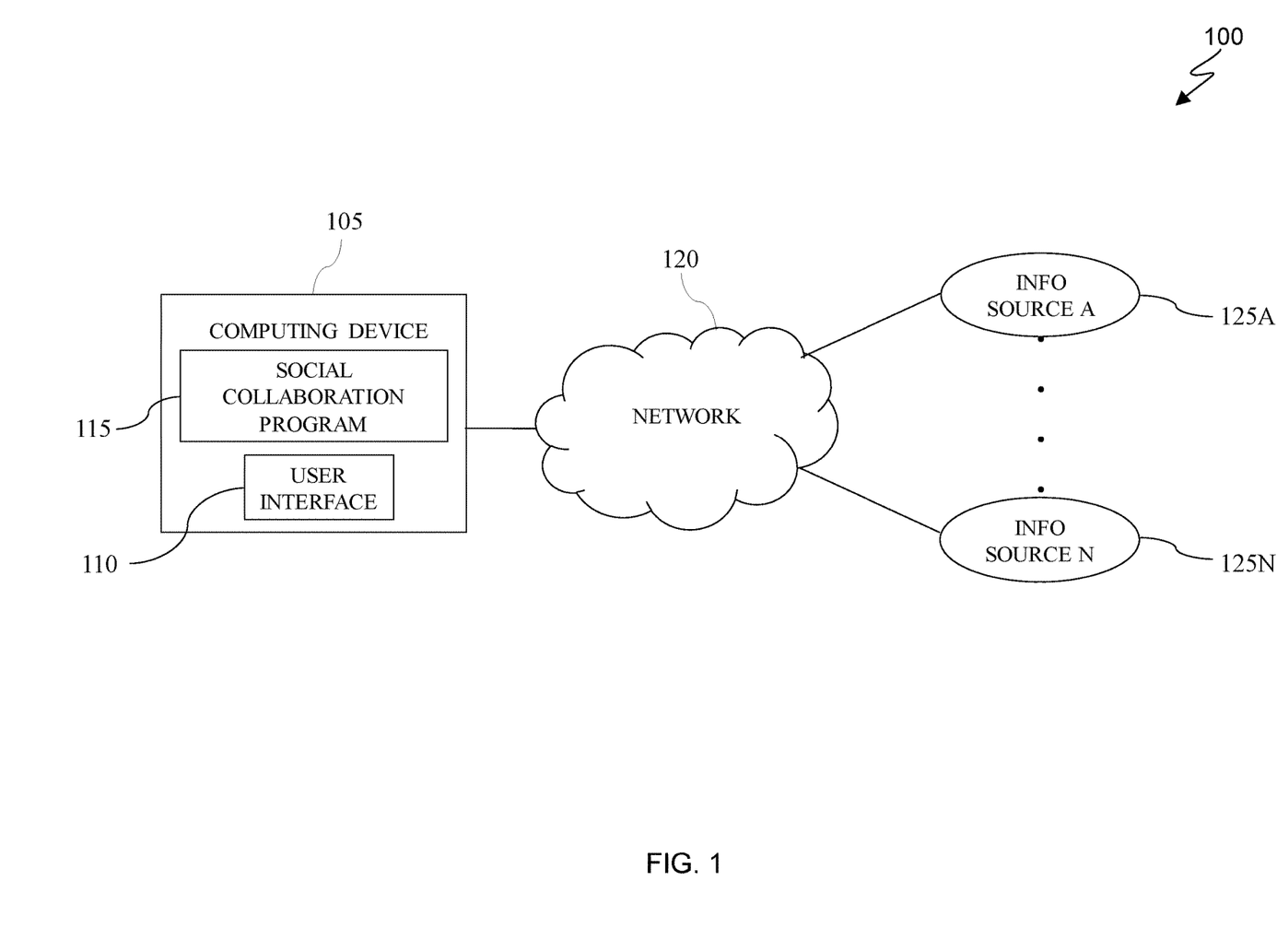
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes info sources 125A-N and computing device 105 connected by network 120. Info sources 125A-N are read in parallel.

Info sources 125A-N are sources of information/data amenable to processing by social collaboration program 115. The number of info sources 125A-N may vary depending on the user and can be processed in a parallel, efficient, and scalable fashion. Info sources 125A-N may be devices (which are not limited to a personal computer, cell phone, or other computing device); e-mails; text messages; to-do lists associated with software applications; cloud-based applications; social networks services (i.e., platforms to build social relations or social networks among people using a particular platform); and social media (i.e., computer-mediated tools which allow people to create, share, or exchange information in virtual communities and networks). Sources of events may derive from applications that belong to a collaboration platform (i.e., a category of business software which adds broad networking capabilities to work processes).

Network 120 can be, for example, a local area network (LAN), a wide area network (WAN) such as the Internet, or a combination of the two, and can include wired, wireless, or fiber optic connections. In general, network 120 can be any combination of connections and protocols that will support communication between computing device 105 and info sources 125A-N.

User interface 110 may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. User interface 110 is capable of receiving data, user commands, and data input modifications from a user and is capable of communicating with social collaboration program 115.

Social collaboration program 115 outputs a list of people and continuously updates with images. Additionally, a bar is displayed indicative of more detailed information including: the amount activity which took place among people associated with a user, the number of people which were involved, and the different types of activity and relationships. When aggregating events in a stream based on people or objects reminiscent of a community (i.e., the name of an application which people can join/use publicly or privately and serves as a container of more applications), social collaboration program 115 focuses on the outputting of a visualization perspective showing indications of a list of events in a small screen space, the degree of relevancy of this list of events to the end-user, and the focus (i.e., key aspects) of the list of events. This allows a user to immediately decide if the user should "drill into it" (i.e., an action of clicking on some option in a tile which filters the whole view for more events that derive from the same context as in a community) assuming the user has limited time to scan the stream of events for getting oriented at some point throughout the work day. The dimensions of this disclosure focus on the social events by displaying the amount of people involved and the nature (or the degree) of the association between the people involved and the user, under the assumption that the events from a closer network are more relevant. The outputting of a list of keywords may give a quick indication of which topics were discussed allowing the user to decide if anything (i.e., the events, people associated with the events, etc.) piques user interest.

Computing device 105 includes social collaboration program 115 and user interface 110. Computing device 105 may be a laptop computer, a tablet computer, a netbook computer, a personal computer (PC), a desktop computer, a personal digital assistant (PDA), a smart phone, a thin client, or any programmable electronic device capable of communicating with info source 125A-N. Info sources 125A-N can processed by computing device 105 over one or more servers, which is not shown in drawing. Additionally, there can be multiple computing devices 105, each associated with a unit of info sources 125A-N processed in parallel.

Figure 6:
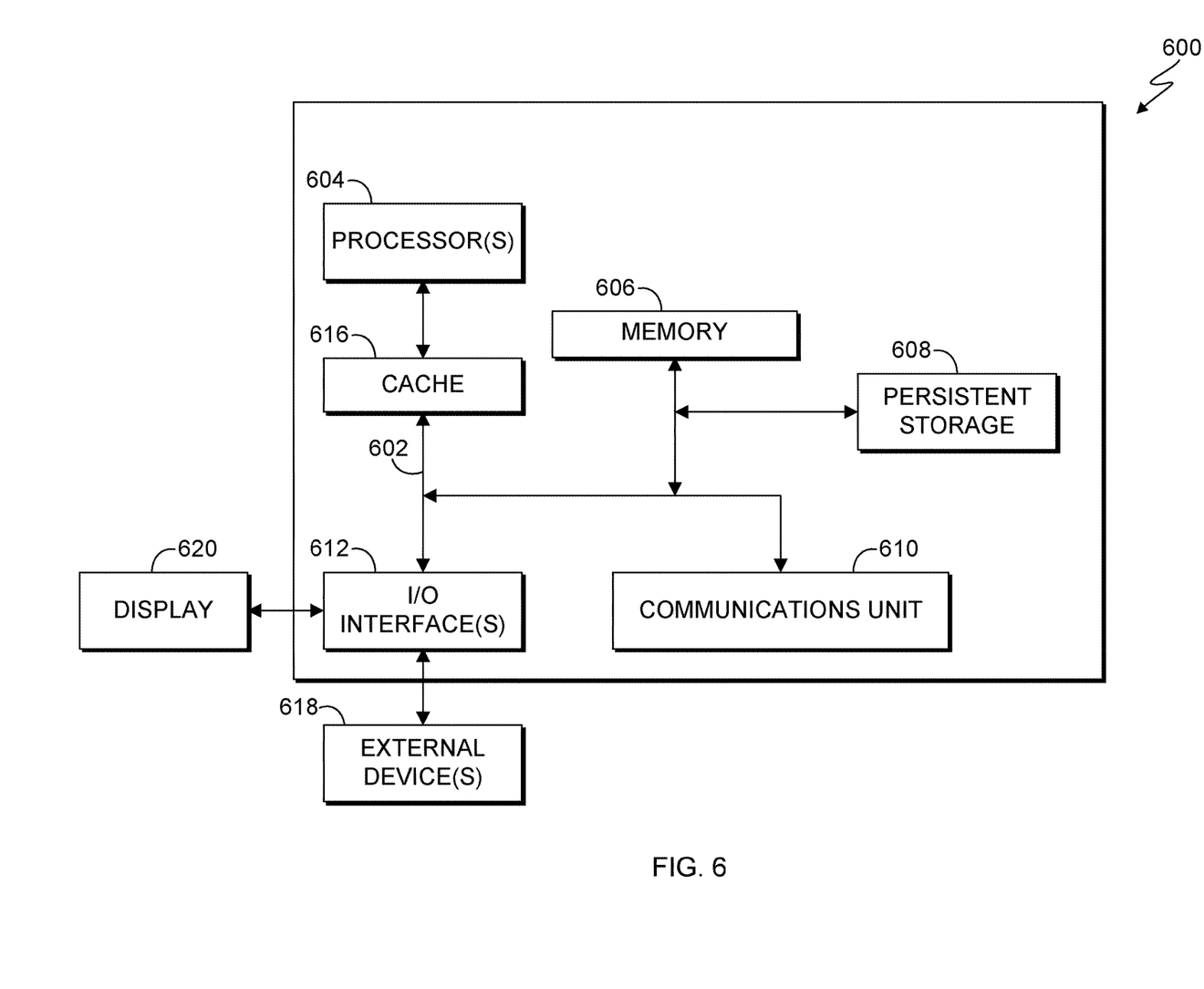
FIG. 6 depicts a block diagram of internal and external components of a computing device, in accordance with an embodiment of the present invention.

Computing device 105 may include internal and external hardware components, as depicted and described in further detail with respect to FIG. 6.

Figure 2:
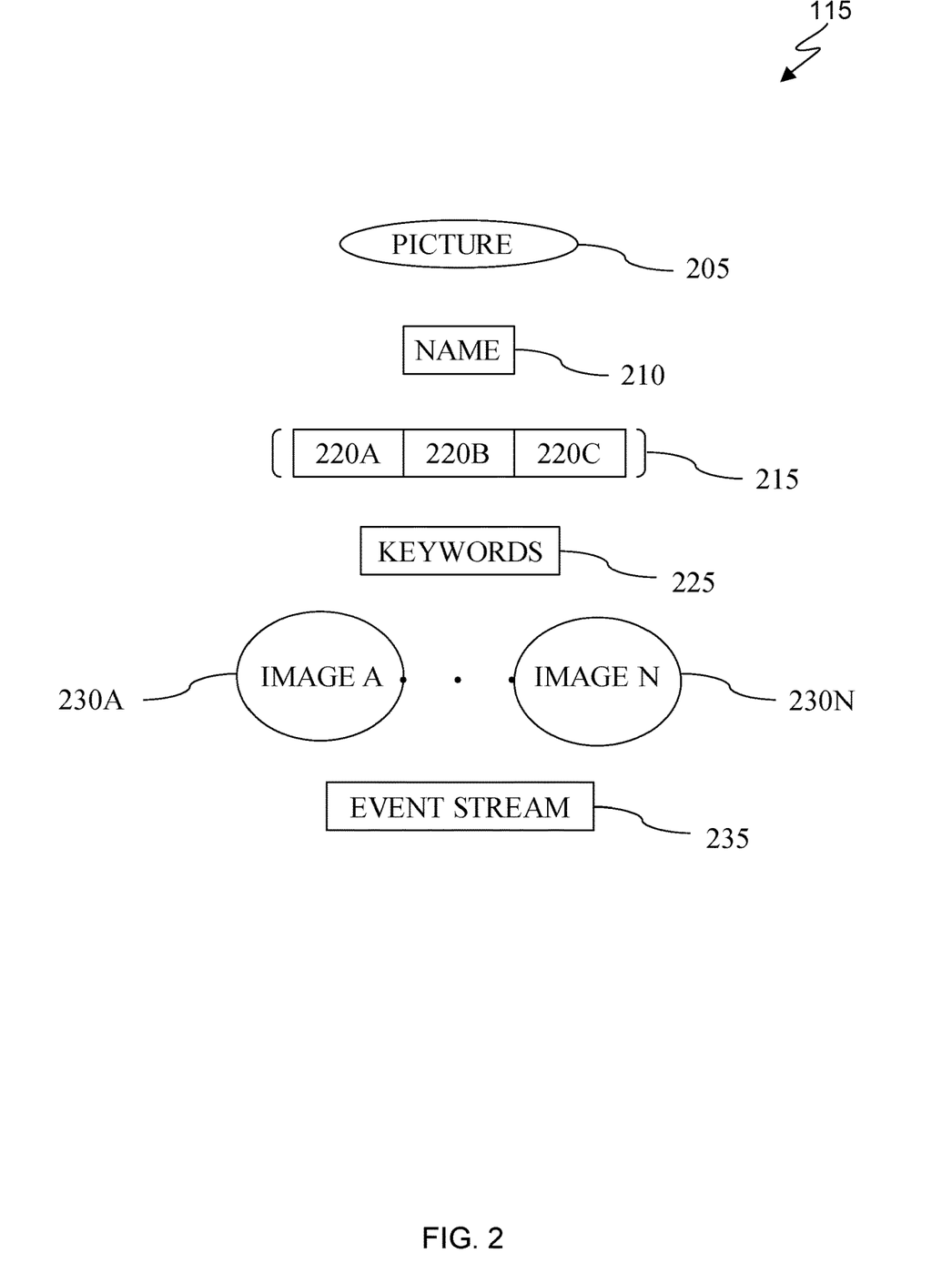
FIG. 2 is an example of a user interface set-up, generated by a social collaboration program 115, in accordance with an embodiment of the present invention.

FIG. 2 is an example of a user interface set-up, generated by a social collaboration program 115, in accordance with an embodiment of the present invention.

Social collaboration program 115 displays as many insights as possible to the user (who wants to figure out a group of events to focus on within a limited time-frame) when aggregating events in the stream based on events, people, or objects within a defined group or object (i.e., a specific community application instance). From a visualization perspective, the insights dimension focuses on social aspects, people, and tags/keywords. The display depicted in FIG. 2 comprises of a photograph of an entity which may be a person or organization within picture 205; the name of the entity within name box 210; an overall bar showing a total count of events within count bar 215 wherein the level of importance of the events to a user and the level of interest associated with the events to a user are depicted by sub-count bars 220A, 220B, and 220C; a set of generated keywords within keyword box 225; images of other entities, which the user is following (or are important to the user) and accounted for in count bar 215, within images 230A-230N; and a stream of aggregated events within event stream 235.

Count bar 215 is an indication of the amount of people involved with a set of aggregated events and an indication of how these people are related to the user. Count bar 215 shows the total count (i.e., number) of events. Sub-count bars 220A, 220B, and 220C show the number of events for a sub-set of people which are relevant to the user and have relevant events in this group of aggregated events. Typically, the color of count bar 215 is different shades of a color, which can be configured upon a user's preference. In one embodiment, a bolder shade of a color may be indicative of people with a stronger relationship to whom the user is working with on a daily basis (and may have a shortcut to these people at the top of the page and may be more commonly referred to as "People Important to Me"). For example, if the shade of green for sub-count bar 220A is darker than the shade of green for sub-count bar 220B and the shade of green for sub-count bar 220B is darker than the shade of green for sub-count bar 220C, then the people (working with the user) associated with 220A may have the strongest relationship to the user and the people (working with the user) associated with 220C may have the weakest relationship to the user. In other embodiments, the lengths of sub-count bars 220A, 220B, and 220C may vary where the relative size of the lengths of sub-count bars 220A, 220B, and 220C are indicative of the number of recent events. For example, if sub-count bar 220C is greater in length than sub-count bar 220B and sub-count bar 220B is greater in length than sub-count bar 220A, then sub-count bar 220C has the highest number of recent events and sub-count bar 220A has the lowest number of recent events. The exact number of events may be made available to the user, for example, by placing a cursor for the sub-count bar where social collaboration program 115 displays these exact numbers to the user.

Keyword box 225 is a displayed list of keywords/tags which gives an indication of which topics were discussed. The user can decide if the topics are interesting to the user or not. Tags/keywords are a simple and consumable piece of information when looking at an item. The item is a topic of interest to a user, or a stream of events of interest to a user. The tags can be real tags from the content or extracted tags/keywords upon the application of a suitable analytics technique. The keywords/tags can be links accessible by a user where clicking on the links refreshes a screen and filters all of the events from that context (e.g., a specific community) to events with the keyword.

Images 230A-N are displayed below count bar 215. In an embodiment, a limited number images of people that the user is following and/or important to the user while concomitantly counted in count bar 215 are displayed. If a person—person A—is someone whom the user follows, but is not concomitantly counted in count bar 215, then person A is not displayed in images 230A-N. The number of images shown in images 230A-N and the shape (i.e., length and shade of color) of sub-count bars 220A-C correlate with one another. More people are displayed in images 230A-N by social collaboration program 115 when there are more people which are relevant to the user, which is indicative of the list of people is longer as count bar 215 is longer and a darker shade of color. For example, there are two users—IM and EM. Sub-count bar 220A within count bar 215 for IM is much larger than sub-count bar 220A within count bar 215 for EM. Thus, more images within image 230A are displayed for IM than for EM.

Event stream 235 is a list of events (i.e., insights pertaining to events) based on people and/or objects (e.g., a community). The insights are some type of "established knowledge" which relates to events and people where the "established knowledge" is something the end-user was not aware of. The events within event stream 235 typically focus on social dimensions. Event stream 235 contains only relevant events within a group of aggregated events where the aggregated events derive from people who are associated with the user (as indicated by count bar 215). The analytics involved in displaying the content within event stream 235 is described in more detail with respect to FIG. 3. The list of events within event stream 235 may be in text and/or image form.

Figure 3:
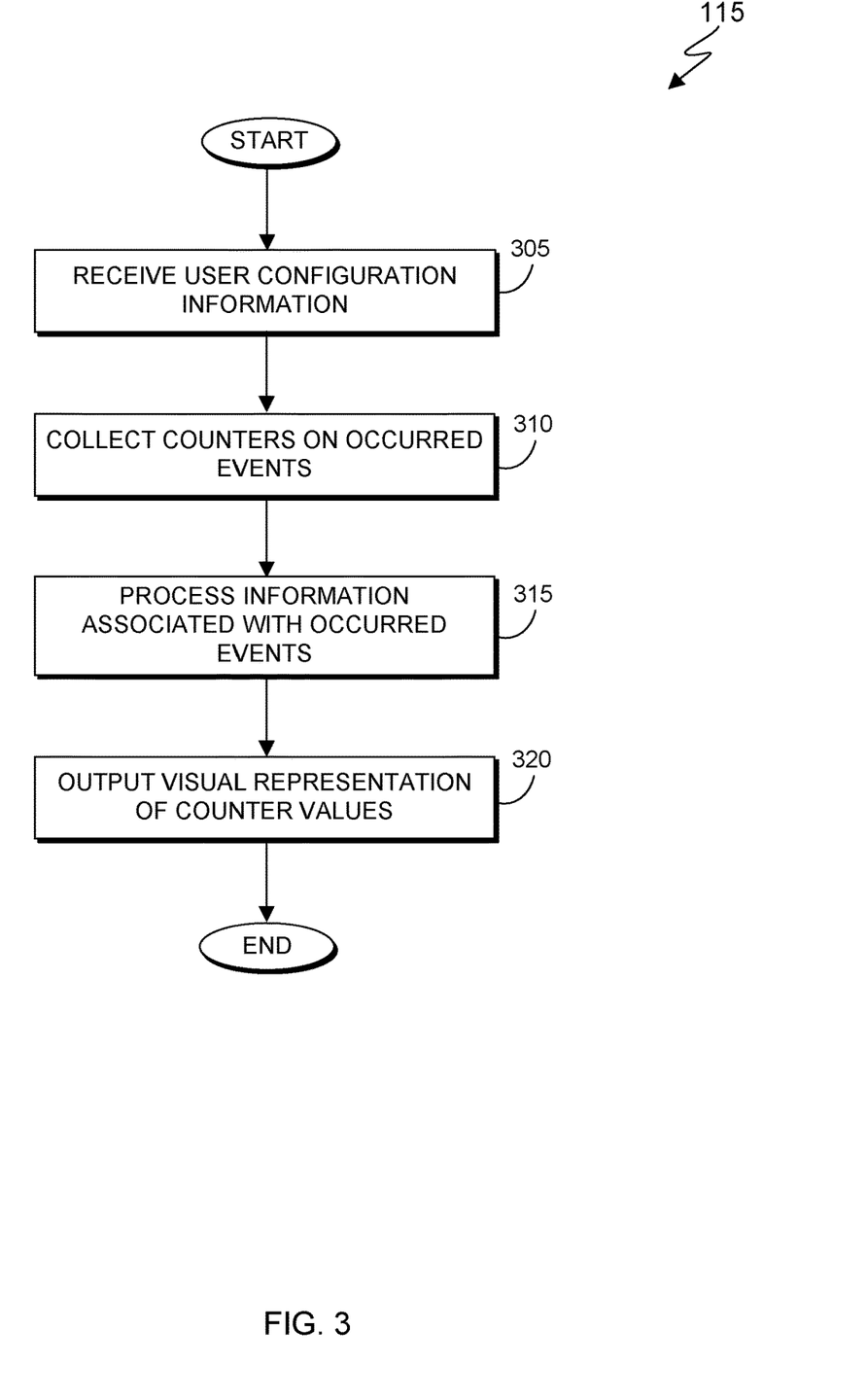
FIG. 3 is a flowchart depicting the operational steps performed by social collaboration program 115 in order to output the visualization to a user, in accordance with an embodiment of the present invention.

FIG. 3 is a flowchart depicting the operational steps performed by social collaboration program 115 in order to output the visualization to a user, in accordance with an embodiment of the present invention.

Steps 305, 310, and 315 are continuous processes which occur in parallel on all servers and use an inverted index to efficiently assess user relationships to others. Map-reduction logic is utilized to aggregate counters across servers. The implications of these capabilities suggests scalable solutions for complex problems.

In step 305, social collaboration program 115 receives user configuration information. Social collaboration program 115 receives input(s) from a user which receives the name and image of the user (i.e., name box 210 and picture 205, respectively); the relationship of the user to other people and entities within a community and/or defined social network to work in concert with count bar 215; and the nature of the relationship to work correlatively with count bar 215 and sub-count bars 220A, 220B, and 220C In step 310, social collaboration program 115 collects counters on occurred events within a defined environment (i.e., a community or among specific people). The counters are collected on a number of events which occur by a specific set of people that match specific relationships in a specific bucket (i.e., a type of data buffer or a type of document in which data is divided into regions which have a fixed size upon creation, a limited number of states, and has unsorted contents) within a specific day by a scalable manner. The architecture for calculating the counters per user per set of people (i.e., potential actors who performed the event, such as creating a wiki page, and has a relationship/associate to the end-user) with different relationships can prove to be challenging when it comes to large volume social objects such as communities with a potential of hundreds of actions per day per community and millions of users on the platform. Often the platform is offered at the cloud computing level for multiple large customers. Social collaboration program 115 aims to be efficient by avoiding the calculation of counters per end-user at run-time when the feed is returned to the user for display. See the description with respect to FIG. 4 for more details for calculating the counters per end-user per set of people with further relationships to other people.

In step 315, social collaboration program 115 processes information associated with the occurred events. Social collaboration program 115 attempts to avoid bringing up all events per day from step 310. Instead social collaboration program 115 desired to only display the top events (i.e., relevant events) to the user with the counters of events processed. The processing of information associated with the occurred events comprises: performing aggregation on the collected counters per occurred events (i.e., the process of collecting content from multiple social network services into one unified presentation); managing the social information associated with the users which are connected to potential actors (i.e., the people associated with counters described above) by collecting, holding, and updating this social information); examining the social information associated with the users which are connected to potential actors (i.e., the people associated with the counters described above); sending the identification (i.e., the name) of the people as "terms" on the end-user document while using the relationship type as a "field" to an inverted index that as a result of the inversion will point from the actors (i.e., the identified people) to a user that the events of the actor should be counted for; aggregating relationships; replicating the inverted index to all nodes (i.e., a computing unit) to local disks in order for a distributed processing engine to read the inverted index effectively (where within index structures, there are posting lists that are highly optimized in size and for reading from a disk in order to support mechanisms for serving search engines which need to reply in a sub-second timeframe for complex queries over large set of data); mapping nodes based on an actor where the same actor is processed on the same node in order to result in reading the same post-listing from the inverted index and ensure the caching and memory footprint will be optimal per node; working in conjunction with a streaming distributed processing engine (e.g., Spark™); utilizing map-reducing logic in order to sum up the counts across the nodes and the end result will be the number of events from actors for a specific type of relationships for the period of time that was processed; combining results from a current processing with previous processing(s); and processing events and counters within a time frame of minutes despite the counts per day changing continuously throughout the day.

Examples of aggregating relationships include: (a) "Colleagues" deriving from an organizational structure, direct network, and social dynamic network; (b) "ITM" deriving from people which the user selects as important people which he interact with on daily basis; and (c) "Followed" deriving from people which the user is interested in and follows the people's activities.

In step 320, social collaboration program 115 outputs a visual representation of counter values (from steps 305, 310, and 315). A more detailed description of the visual representation of the counter values is found with respect to FIG. 5.

Figure 4:
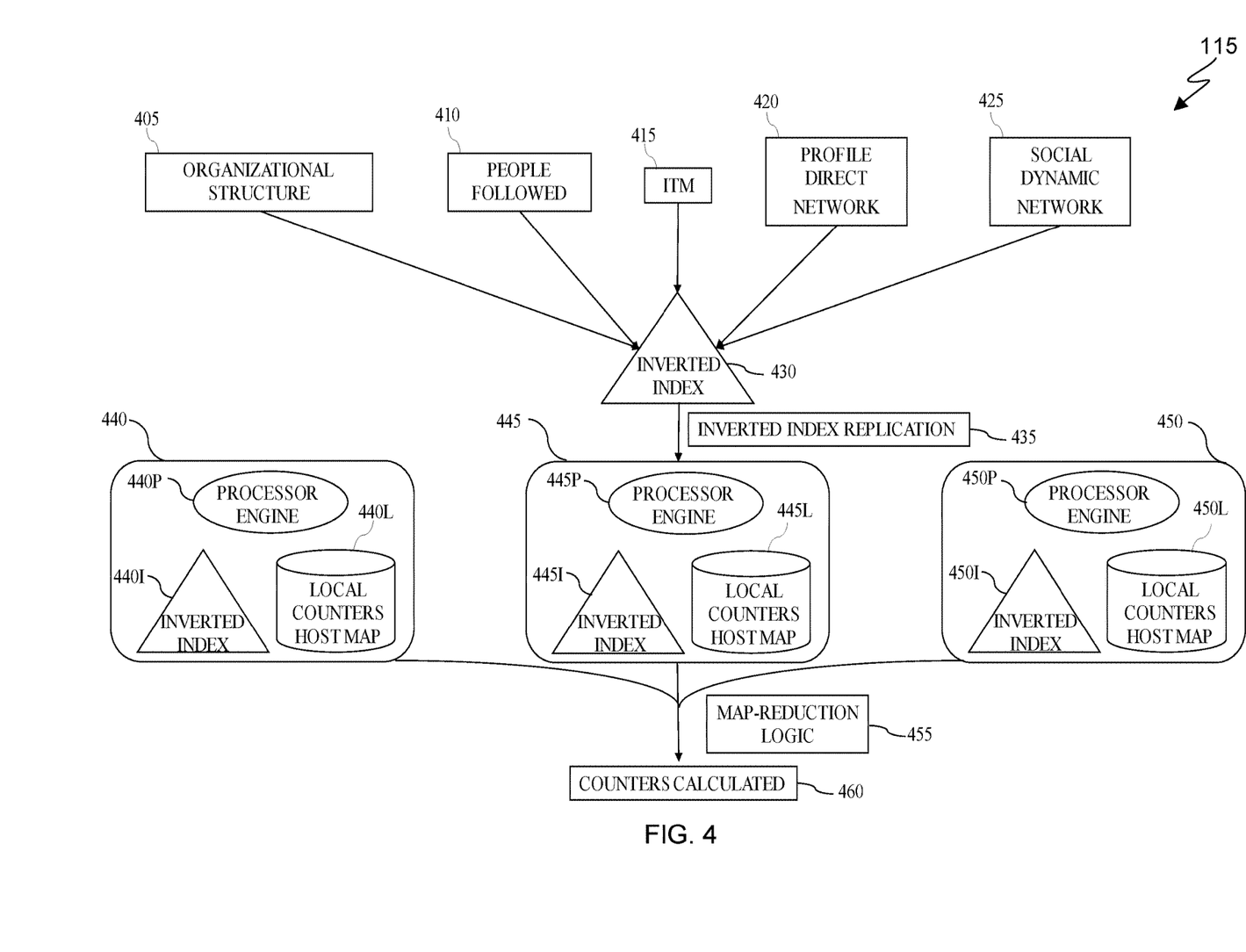
FIG. 4 is a schematic diagram depicting the architecture for calculating counters per end-user per set of people by social collaboration program 115, in accordance with an embodiment of the present invention.

FIG. 4 is a schematic diagram depicting the architecture for calculating counters per end-user per set of people by social collaboration program 115, in accordance with an embodiment of the present invention.

The architecture for calculating the counters per end-user per set of people, with further relationships with other people, may prove to be a very complex and involved process within large social objects. Social objects, such as communities, may potentially have hundreds of actions per day per community, while having millions of users within the social platform. These social platforms are offered at the cloud level for multiple large customers. In addition to being able to process data for calculating the counters within large and complex social objects, the run-time of social collaboration program 115 needs to be very efficient and fast to avoid calculating the counters at run-time when the feed is returned to the client for display (i.e., outputted to a user). Social collaboration program 115 does not display all the events per day, but only the top events for the end-user with counters preprocessed.

Social collaboration program 115 aggregates social network information about people to people relationships, while simultaneously making the social network information accessible in a fast and effective manner from a response and a memory footprint for the distributed processing engine, which in turn, maximizes data locality for performing the required calculations of counters. Social collaboration program 115 can manage (i.e., collecting, holding, and/or updating) the social information associated to end-users connected to potential actors.

Inverted index 430 receives social network information, information/data pertaining to the identification of potential actors (the people associated the counters) as "terms" on the end-user document, and information/data pertaining to the relationship types as a "field." The result of the inversion in inverted index 430 will point from potential actor and relationship-types to end-users that the events associated with the actor should be counted for. Within an index structure in inverted index 430, this type of data/information is called a posting list. Posting lists are highly optimized in size and to be processed from by a disk. This type of mechanism serves search engines which need to reply within sub-seconds for complex queries over a large set of data.

Some of the relationships could be aggregated as: "Colleagues" ("Org Structure" in data 405, "Profile Direct Network" in data 420, and "Social Dynamic Network" in data 420); "ITM" (data 415 where people are selected as being people of importance by a user due the user's daily interactions with these people); and "Followed" (data 410 where people are selected as being people of interest and following activities by a user). The information/data from aggregated relationships within data 405, 410, 415, 420, and 425 are fed into inverted index 430.

Inverted index 430 undergoes process 435. Process 435 is the replication of inverted index 430 to all of the nodes to the local disk, so the distributed processing engine will be able to read those effectively. In FIG. 4, social collaboration program 115 replicates inverted index 430 to the nodes 440, 445, and 450 as 4401, 4451, and 4501, respectively. The distributed processing engines within nodes 440, 445, and 450 contain processor 440P, 445P, and 450P, respectively. The events are processed in order to map those events to nodes based on the actor. Thus, the same actor is always processed in the same node. The events are mapped within nodes 440, 445, and 450 to local counter host maps 440L, 445L, and 450L, respectively. Thus, this type of mapping results in always reading the same post-listing from inverted index 430, and further results in optimal caching and memory footprint per node.

Nodes 440, 445, and 450 serve as an input for process 455. Nodes 440, 445, and 450 contain streaming distributed processing engines. Process 455 is the utilization of map-reduction logic for summing up the counts across nodes 440, 445, and 450 which results in the number of events from actors for a specific type of relationship for a processed period of time. These results are added up to previous processing trials. The counts are per day change continuously through the day. The window of time in which events are processed should be within minutes. The counters are calculated upon performing process 455, which leads to resultant data 460.

Figure 5:
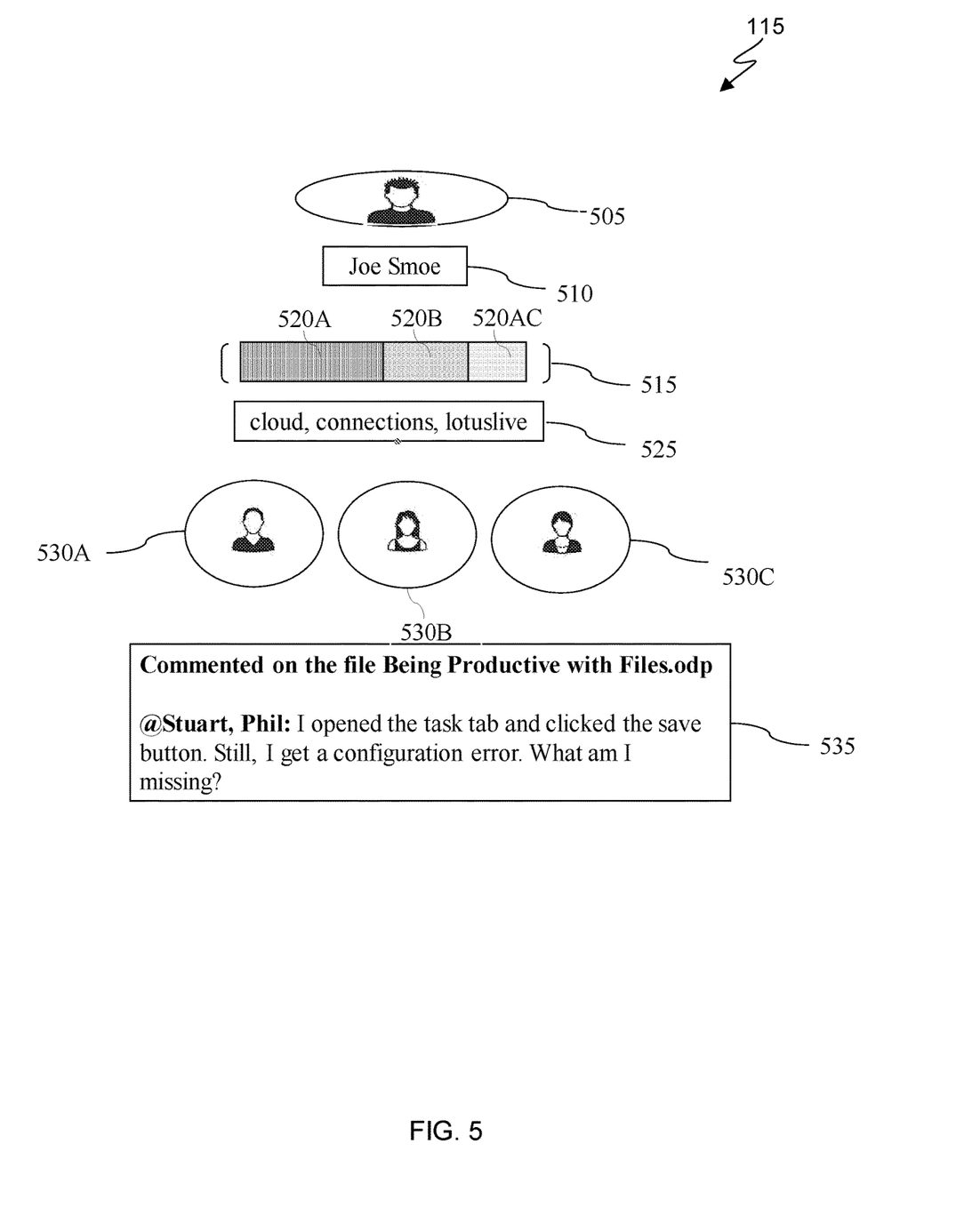
FIG. 5 is an example of a user interface set-up for a specific user, generated by social collaboration program 115, in accordance with an embodiment of the present invention.

FIG. 5 is an example of a user interface set-up for a specific user, generated by social collaboration program 115, in accordance with an embodiment of the present invention.

Social collaboration program 115 outputs to a user resembling a depiction as shown in FIG. 5, after performing steps 305, 310, 315, and 320 in FIG. 3.

The visualization in FIG. 5 shows a single event but in other embodiments, it is possible to see more via clicking left or right or through a touching interface. The display of the aggregated counters and tags and people images are clear to the user that the user is seeing something aggregated and the user can view more events in the same context. The counters may be displayed while hovering.

The components of the visualization are: (i) a photograph of the entity as picture 505; (ii) "Joe Smoe" in box 510 (which is the name of the entity); (iii) the events and counters within count bar 515; (iv) the highest level of importance of the events to the user and the highest level of interest are depicted by sub-count bar 520A; (v) the intermediate level of importance of the events to the user and the intermediate level of interest are depicted by sub-count bar 520B; (vi) the lowest level of importance of the events to the user and the lowest level of interest are depicted by sub-count bar 520C; (vii) the generated keywords are: "cloud", "connections", "lotuslive" within keyword box 525; (viii) the images of three other entities which the user is following (or are important to the user) and counted in count bar 515 as images 530A, 530B, and 530C; the stream of aggregated events of: "Commented on the file Being Productive with Files.odp" and "@Stuart, Phil: I opened the task tab and clicked the save button. Still, I get a configuration error. What am I missing?" as event stream 535.

FIG. 6 depicts a block diagram of components of a computing device, generally designated 600, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between computer processor(s) 604, memory 606, cache 616, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 for execution and/or access by one or more of the respective computer processors 604 via cache 616. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 508 through communications unit 610.

I/O interface(s) 612 allows for input and output of data with other devices that may be connected to computing device 600. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for use in a distributed computing environment including a plurality of computing nodes, the method comprising:
   receiving an end user configuration information data set including: (i) information indicative of a relationship between a first user and a plurality of entities in a defined social environment, and (ii) information indicative of a degree of the relationship between the first user and each entity of the plurality of entities in the defined social environment;
   receiving an insight query data set including information indicative of: (i) a target date of events, (ii) a target data bucket including a plurality of events from a social activity stream, and (iii) a target degree of relationship between the end user and a queried entity;
   processing an insight query based, at least in part, on the insight query data set, with the processing including:
      collecting an event count data set including information indicative of a sum total number of times events occurred, counting only events that: (i) occurred on the target date of events, (ii) are located within the target data bucket, and (iii) and were undertaken by entities of the plurality of entities that match the target degree of relationship,
      aggregating counters from multiple social network services into the collected event count data set,
      managing social information associated with the plurality of entities, and
      determining a query response data set based, at least in part, on the event count data set; and
   outputting a visual representation of the query response data set to at least one computer device over a computer network.

2. The method of claim 1 wherein processing the insight query further comprises:
   determining a subset of the plurality of entities which are relevant to the insight query;
   using a degree of the relationship between the first user and an entity as a field to an inverted index, where a result of inversion will point from the entity to the first user, indicative that events of the entity should be included in the event count data set; and
   sending an identification of each entity of the subset of the plurality of entities as terms on the visual representation.

3. The method of claim 1 wherein the visual representation of the query response data set includes a visual representation of the event count data set.

4. The method of claim 1 wherein the visual representation of the query response data set includes at least one photograph of at least one entity of the plurality of entities that match the target degree of relationship.

5. The method of claim 1 wherein determining a query response data is determined on a single node in the distributed computing environment.

6. The method of claim 5 wherein determining the query response data on the single node in the distributed computing environment optimizes processing of the insight query by localizing all relevant cache and memory data for processing the insight query.

7. A computer program product (CPP) for use in a distributed computing environment, the CPP comprising:
   a computer readable storage medium; and
   program instructions stored on the computer readable storage medium, with the program instructions including instructions for causing one or more computer processors to perform operations including the following:

receiving an end user configuration information data set including: (i) information indicative of a relationship between a first user and a plurality of entities in a defined social environment, and (ii) information indicative of a degree of the relationship between the first user and each entity of the plurality of entities in the defined social environment, receiving an insight query data set including information indicative of: (i) a target date of events, (ii) a target data bucket including a plurality of events from a social activity stream, and (iii) a target degree of relationship between the end user and a queried entity, processing an insight query based, at least in part, on the insight query data set, with the processing including:

collecting an event count data set including information indicative of a sum total number of times events occurred, counting only events that: (i) occurred on the target date of events, (ii) are located within the target data bucket, and (iii) and were undertaken by entities of the plurality of entities that match the target degree of relationship, aggregating counters from multiple social network services into the collected event count data set, managing social information associated with the plurality of entities, and determining a query response data set based, at least in part, on the event count data set, and outputting a visual representation of the query response data set to at least one computer device over a computer network.

8. The CPP of claim 7, wherein the program instructions further include instructions for causing the one or more computer processors to perform the following operations:

determining a subset of the plurality of entities which are relevant to the insight query;

using a degree of the relationship between the first user and an entity as a field to an inverted index, where a result of inversion will point from the entity to the first user, indicative that events of the entity should be included in the event count data set; and sending an identification of each entity of the subset of the plurality of entities as terms on the visual representation.

9. The CPP of claim 7 wherein the visual representation of the query response data set includes a visual representation of the event count data set.

10. The CPP of claim 7 wherein the visual representation of the query response data set includes at least one photograph of at least one entity of the plurality of entities that match the target degree of relationship.

11. The CPP of claim 7 wherein determining a query response data is determined on a single node in the distributed computing environment.

12. The CPP of claim 11 wherein determining the query response data on the single node in the distributed computing environment optimizes processing of the insight query by localizing all relevant cache and memory data for processing the insight query.

13. A computer system (CS) for use in a distributed computing environment, the CS comprising:
one or more computer processors;
a computer readable storage medium; and
program instructions stored on the computer readable storage medium, with the program instructions including instructions for causing the one or more computer processors to perform operations including the following:

receiving an end user configuration information data set including: (i) information indicative of a relationship between a first user and a plurality of entities in a defined social environment, and (ii) information indicative of a degree of the relationship between the first user and each entity of the plurality of entities in the defined social environment, receiving an insight query data set including information indicative of: (i) a target date of events, (ii) a target data bucket including a plurality of events from a social activity stream, and (iii) a target degree of relationship between the end user and a queried entity, processing an insight query based, at least in part, on the insight query data set, with the processing including:

collecting an event count data set including information indicative of a sum total number of times events occurred, counting only events that: (i) occurred on the target date of events, (ii) are located within the target data bucket, and (iii) and were undertaken by entities of the plurality of entities that match the target degree of relationship, aggregating counters from multiple social network services into the collected event count data set, managing social information associated with the plurality of entities, and determining a query response data set based, at least in part, on the event count data set, and outputting a visual representation of the query response data set to at least one computer device over a computer network.

14. The CS of claim 13, wherein the program instructions further include instructions for causing the one or more computer processors to perform the following operations:

determining a subset of the plurality of entities which are relevant to the insight query;

using a degree of the relationship between the first user and an entity as a field to an inverted index, where a result of inversion will point from the entity to the first user, indicative that events of the entity should be included in the event count data set; and sending an identification of each entity of the subset of the plurality of entities as terms on the visual representation.

15. The CS of claim 13 wherein the visual representation of the query response data set includes a visual representation of the event count data set.

16. The CS of claim 13 wherein the visual representation of the query response data set includes at least one photograph of at least one entity of the plurality of entities that match the target degree of relationship.

17. The CS of claim 13 wherein determining a query response data is determined on a single node in the distributed computing environment.

18. The CS of claim 17 wherein determining the query response data on the single node in the distributed computing environment optimizes processing of the insight query by localizing all relevant cache and memory data for processing the insight query.

\* \* \* \* \*